July 21, 1959 — R. E. SANCTUARY — 2,895,710
BALL VALVE
Filed May 29, 1956
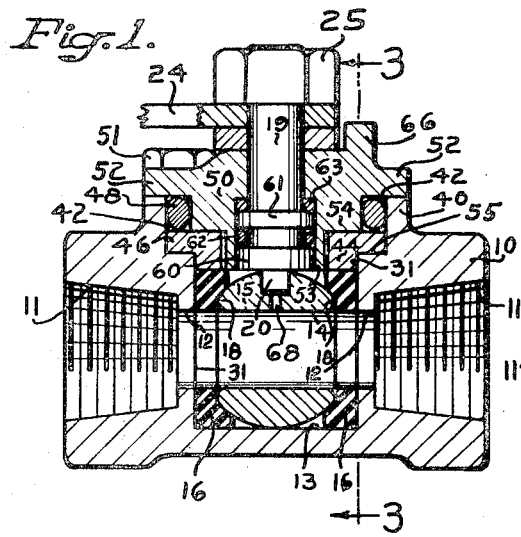
Fig. 1.
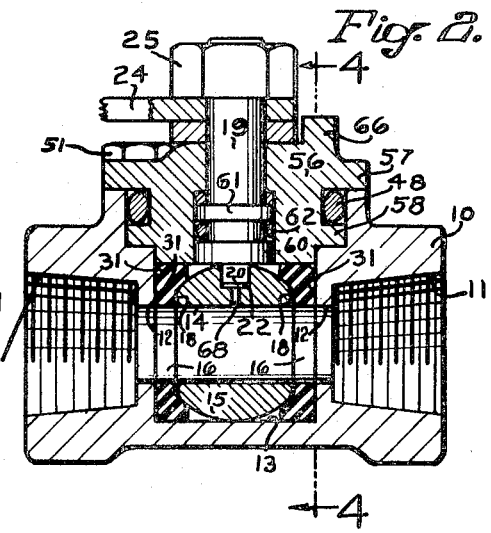
Fig. 2.
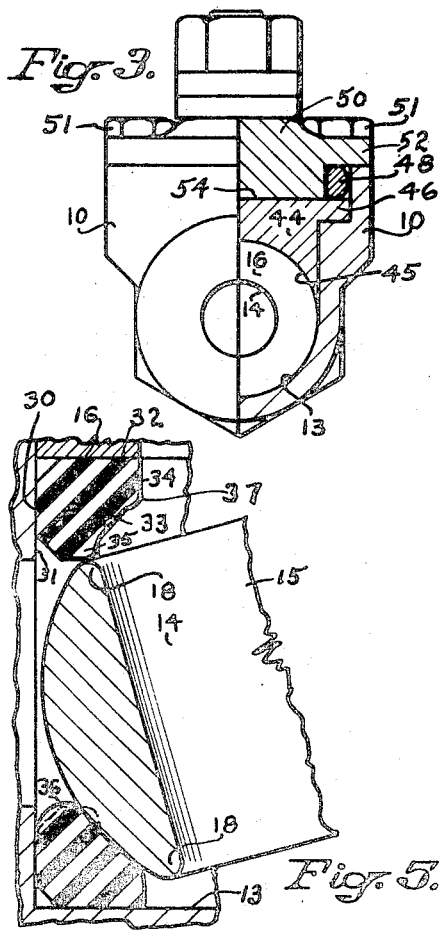
Fig. 3.
Fig. 5.
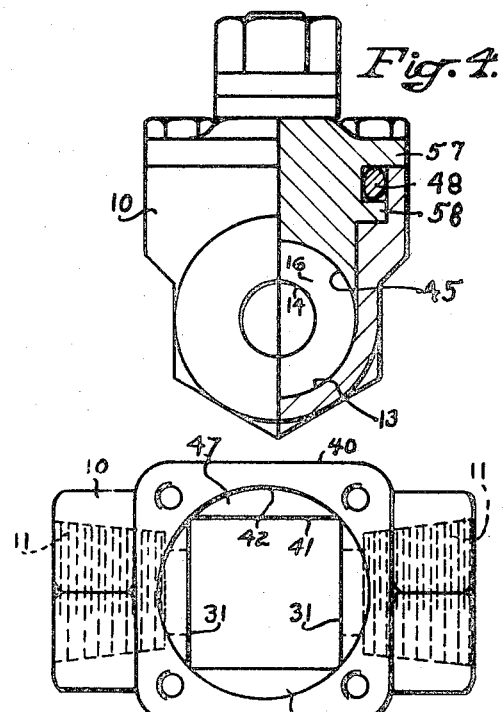
Fig. 4.
Fig. 6.
INVENTOR.
Robert E. Sanctuary
BY
Clayton L. Jenks

United States Patent Office 2,895,710
Patented July 21, 1959

2,895,710
BALL VALVE

Robert E. Sanctuary, Shrewsbury, Mass., assignor to Worcester Valve Co., Inc., Worcester, Mass., a corporation of Massachusetts Application May 29, 1956, Serial No. 588,064

3 Claims. (Cl. 251—312)

This invention relates to ball valves, and more particularly to a valve having a partially spherical ball provided with an opening therethrough, which may be rotated to permit or to stop the passage of fluid.

One type of ball valve comprises a ball plug having a hole arranged to communicate with aligned fluid passages when the valve is open and which may be manually rotated to a lateral position where the spherical portion of the ball closes the exit passage and stops the fluid flow. The central hole through the ball forms substantially parallel annular nose portions, and two elastomer seat rings, or a single ring and a metal washer herein considered a seat ring, are arranged to be engaged by the noses when the valve is open. A dual direction valve adapted for fluid flow in either direction has two seat rings on opposite sides of the ball, and the ball and its opposed rings are preferably assembled under compression within a cylindrical chamber in the valve body. A stem engages the ball in that chamber and serves to rotate the ball through 90 degrees to control the fluid. Because of the rotative contact of the nose portion of the ball with a seat ring, there is a consequent wearing action which in time requires removal of the parts and replacement of the seat rings.

The primary object of this invention is to provide a construction which permits ready assembly, removal and reassembly of the ball and its associated rings without removing the valve body from the fluid line. Other objects will be apparent in the following disclosure.

Referring to the drawings illustrating dual direction valves:

Fig. 1 is a central vertical section of one valve construction;

Fig. 2 is a similar view of a modification;

Fig. 3 is an elevation broken away at the right to show a transverse section on the line 3—3 of Fig. 1;

Fig. 4 is a similar view taken on the line 4—4 of Fig. 2;

Fig. 5 is a fragmentary, enlarged, horizontal sectional view showing the relation of ball and seating ring; and Fig. 6 is a plan view of the valve body of Fig. 1, with the cap removed.

The valve structure comprises in general a body 10 made of a suitable material, such as bronze, which has two axially aligned openings 11 arranged for connecting the valve into a pipe line, such as by means of threaded connections. Cylindrical passages 12 at each side communicate with a central inner space 13 in the valve body. The passages 12 communicate with a passage 14 through a ball plug 15 when the valve is open. The ball plug is mounted between two seat rings 16, either one or both of which may be made of an elastic material, such as a fairly stiff vulcanized rubber compound. If only one is an elastomer, the other may be a metal washer or other desired material. The provision of a large cylindrical passage 14 through the ball valve results in there being an annular nose 18 at each side of the ball, and the nose sides of the ball lie substantially in parallel planes. When the fluid flow is to be stopped, the ball is turned through an angle of 90° so that its spherical surface is opposed to the outlet passage. The ball may be rotated between the off and on positions by means of a stem 19 which has a lug 20 at its lower end making a loose fit in a shallow slot 22 in the top of the ball, as illustrated. A handle 24 may be secured to the top of the stem by means of a lock nut 25 suitably threaded on the top of the stem above the handle, the latter being provided with a suitable hole surrounding the stem.

In order that fluid may be introduced in either direction through the valve, it is preferred that a double seal be provided by employing two elastomer seat rings 16, as illustrated. The preferred seat ring may be made in accordance with the construction set forth and claimed in my copending application, Serial #584,024, filed May 10, 1956 now U. S. Patent No. 2,858,098 dated October 28, 1958.

This seat ring, as shown in Fig. 5, comprises an annular elastomer body having a rear wall 30 adapted to engage one of the parallel end walls 31 of the inner space 13 and provide a seal thereagainst on the down stream side of the valve body. The ring has an outer cylindrical wall 32 and an inner conical wall 33 arranged obliquely relative to the rear wall 30 and a suitably shaped front wall 34. As more fully described in my prior patent application, the ring is provided with a rounded lip 35 adjacent the cylindrical opening 36 therethrough and a projecting rounded annular rim 37 which borders the opposite side of the conical surface 33 from the lip 35. The passage 36 corresponds in diameter with the ball passage 14. The spherical surface of the ball 15 is adapted to contact the conical surface 33 tangentially in a certain position, and one of the noses 18 of the ball must force its way past either the lip or the rim when the ball is rotated between its open and closed positions. Since the seat rings 16 and the ball 15 are mounted in a close compressive relationship when assembled between the parallel inner walls of the valve body, the operation of turning the ball and forcing its annular nose portions 18 past the substance of the ring tends to wear the ring, and in the course of time requires replacement.

The primary feature of this invention pertains to a structure which makes such replacement easy and convenient and does not require removing the valve body from the fluid line. This is accomplished by a lateral removal of the ball and its associated seat rings. To that end, the construction has a lateral opening through what may be considered the top of the valve body, and the valve stem and associated parts are removably mounted in this opening. At its top, the casing has a rectangular portion 40 (Fig. 6) above the substantially cylindical body which provides the fluid passages. The inner space of the valve body has parallel opposed vertical walls 31 around the openings 11 and parallel opposed vertical walls 41 at right angles to the walls 31, which define a space of rectangular horizontal cross-section within which the ball 15 and the seat rings 16 are located. The bottom of the space 13 is formed by a U-shaped, concave, part-cylindrical surface which merges with the side walls 41, as is best shown in Figs. 3 and 4, to form a U-shaped wall for supporting the seat rings. Above the space formed by these opposed parallel walls is a larger cylindrical vertical opening 42. The ball of the two seat rings engaging its opposite sides are to be removably inserted as a unit through the opening 42.

The lower concave wall portion of the valve casing space 13 within which the ball and rings are assembled provides the bottom half of an internal cylindrical surface or wall of such a size that the seat rings 16 fit snugly against that bottom with the ball supported therebetween. The upper half of that internal cylindrical wall for supporting the rings is provided by a bonnet unit, shown in Figs. 1 and 3 as having a separate retainer 44, which has its lower surface 45 shaped as a half cylinder and sized to fit snugly against the rings, so that the U-shaped bottom portion of the space 13 and the retainer surface 45 cooperate to form a substantially complete inner cylindrical casing wall for carrying the ball and ring assembly.

In the structure of Figs. 1 and 3, the upper portion of the retainer 44 has a circular flange 46 which fits into the upper cylindrical portion of the opening 42 and is shaped to rest on the four arcuate shoulders 47 (Fig. 6) of the enlarged recess 42. The retainer is rectangular in horizontal section below the flange and so slidably fits in the central space formed by the perpendicular vertical walls 41 and 31. The bonnet unit includes a cap or bonnet 50 arranged to hold the retainer 44 in place and which is removably secured to the top of the valve body by cap screws 51. The bonnet 50 has a peripheral flange 52 resting on the square top portion 40 of the casing body. The bonnet 50 also has a downwardly depending circular portion 54 of a diameter which fits within the cylindrical wall 42 (Fig. 6) and engages the top of the flanged portion 46 of the retainer and thus serves to hold the latter down in place. A reduced sleeve portion 53 (Fig. 1) of the bonnet 50 projects downwardly and loosely into a central hole in the retainer and provides a sealing surface for an O-ring 62 surrounding the stem. A suitable elastic O-ring 48 of adequate sealing characteristics is mounted in the annular space between the flanges 46 and 52 and between the cylindrical wall 42 of the casing body and the reduced portion 54 of the bonnet. This O-ring thus forms an effective seal against the leakage of fluid which escapes into the U-shaped casing space 13 and around the retainer.

In the modification shown in Figs. 2 and 4, the bonnet and retainer are made as a single integral piece 56 in which the retainer portion has the same type of half cylindrical surface at the bottom adapted to rest on the seat ring 16. This body 56 has flanges 57 and 58 corresponding respectively with the part 52 and the flange 46 of Fig. 1. The O-ring 48 is mounted between these parts as illustrated. The primary difference between the two structures of Figs. 1 and 2 lies in the fact that in the Fig. 1 construction the bonnet 50 is separate from the retainer 44 while in Fig. 2 the bonnet has the retainer integral therewith.

In both constructions, the valve stem 19 has a lower flange 60 and an upper flange 61 spaced from the latter to provide an annular recess around the stem body within which an elastic O-ring 62 may be mounted to provide a seal against the flow of fluid past the stem. The O-rings may be made of suitable elastic material, such as a compressible soft rubber compound. A washer 63' may be located above the upper flange 61 and between it and a reduced cylindrical portion of the bonnet 50 of Fig. 1 or the bonnet 56 of Fig. 2, so that the stem is held properly located by the lock nut 25 and the upper flange 61 and its associated washer 63. The two O-rings are stretched over the lower associated flanges of the stem and the bonnet prior to assembly in the valve body. A lug 66 projecting above the top of the bonnet serves to limit the rotative movement of the stem and its valve ball.

Since the seat rings and the ball are to be assembled under compression between the vertical valve body walls 31, this structure, as will be observed, permits the ball and rings to be thrust down into the body of the valve, after which the bonnet is forced downwardly into place by means of the cap screws 51, thus causing the rings to seat on the bottom of the half cylindrical wall of the valve body space 13 and forcing the half cylindrical under surface of the bonnet to set firmly on top of the rings 16. Thus, a structure has been provided which permits a ready removal of the ball and rings and the reassembly of the ball with new rings as desired. The ball may be provided with a central opening 68 which permits the entry of a tool adapted to lock into the ball and permit it to be forcibly withdrawn for replacement.

The bonnet unit comprising the bonnet proper and the retainer, whether integral or separate, has a flat flange 52 (Fig. 1) or 57 (Fig. 2) which seats on the upper peripheral flat surface 40 of the valve body, and the removal of the cap screws 51 provides for ready disassembly of the parts and gives full access to the ball and rings. The parallel walls 31 provide a confining space for the rings which is not wider than the opening thereabove, so that the rings, which have a slightly greater thickness than the space between the walls 31, may be readily inserted with the ball through the lateral opening and then forcibly crowded into place with a slight compression of the elastomer substance of the rings. The same principle of assembly holds good where there is only one elastomer ring. It will, of course, be appreciated that if but one elastomer seat ring is to be employed to seat against a down stream wall 31, the body construction may be suitably modified. Also, the U-shaped or rounded wall portion of the space 13 and the under surface 45 of the retainer may be shaped to fit the outer periphery of the seat ring, whether the latter requires a cylindrical or other shape of bearing mount.

Hence, various modifications may be made within the scope of this invention, and it will be understood that the above described principles and embodiments are not to be interpreted as limiting the scope of the appended claims.

I claim:

1. A ball valve comprising a body having two longitudinally aligned fluid passages and a lateral opening communicating with a central space, the walls defining said space and lateral opening including parallel annular end walls around the fluid passages and a U-shaped bottom wall, a rotatable ball having an opening therethrough communicable with the fluid passages, annular seat rings fitting against and clampingly securing the ball therebetween and which are supported by said bottom surface and seat laterally against the annular end walls and provide for the passage of fluid therethrough, said parallel walls having a horizontal spacing nearly equal to the thickness of an assembled unit of two seat rings under compression and a ball therebetween and said lateral opening being greater than said spacing and providing a free passage for the simultaneous insertion of said unit elements into operative positions, a removable bonnet unit having a retainer removably insertable through the lateral opening, said retainer having an under partial cylindrical surface cooperating with the U-wall bottom surface to provide a substantially complete cylindrical bearing for the peripheries of the seat rings, said bonnet unit having a vertical bore, a rotatable valve stem projecting through the bore which is connected to rotate the ball between positions of permitting and opposing the passage of fluid therethrough, removable fasteners for securing the bonnet unit on the body and forcing the assembled ball and seat rings downwardly into position within the internal cylinder formed by the U-shaped bottom and the retainer, and seals between the stem and the bonnet unit and between said unit and the wall of the lateral opening of the valve body for preventing the escape of fluid past the stem and the bonnet unit.

2. A ball valve according to claim 1 in which the bonnet unit comprises a flanged cap engaging the top of the retainer, said valve body having an upper surface engaged by the flange of the cap, said fasteners serving for securing the flange in place on the body and positively positioning the seat rings within the internal cylinder formed by the retainer and body.

3. A ball valve according to claim 1 in which the body has a flat top and a recessed shoulder above and laterally of the space occupied by the bonnet unit and the unit has a flange fitting the flat top and removably mounted on the shoulder, and said fasteners removably securing the flange on the shoulder and holding the retainer against the seat rings.

References Cited in the file of this patent

UNITED STATES PATENTS

| | | |
|---|---|---|
| 477,605 | Pratt | June 21, 1892 |
| 2,371,657 | Stark | Mar. 20, 1945 |
| 2,606,738 | Glen | Aug. 12, 1952 |
| 2,858,098 | Sanctuary | Oct. 28, 1958 |

FOREIGN PATENTS

| | | |
|---|---|---|
| 78,414 | Sweden | Sept. 19, 1933 |
| 508,337 | Great Britain | of 1939 |
| 693,257 | Great Britain | of 1953 |